United States Patent
Miragliotta et al.

(10) Patent No.: US 6,997,061 B2
(45) Date of Patent: Feb. 14, 2006

(54) NON-CONTACT TECHNIQUE TO MONITOR SURFACE STRESS

(75) Inventors: Joseph A. Miragliotta, Ellicott City, MD (US); Kenneth R. Grossman, Olney, MD (US); R. Kelly Frazer, Highland, MD (US); Robert J. Bamberger, Jr., Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/847,044

(22) Filed: May 17, 2004

(65) Prior Publication Data

US 2004/0211264 A1     Oct. 28, 2004

Related U.S. Application Data

(62) Division of application No. 10/151,629, filed on May 20, 2002, now Pat. No. 6,763,727.

(60) Provisional application No. 60/292,254, filed on May 18, 2001.

(51) Int. Cl.
*G01L 1/24*     (2006.01)

(52) U.S. Cl. ............................................... 73/800

(58) Field of Classification Search .......... 73/788–800, 73/11, 705, 862–862.69, 762; 374/46–50
See application file for complete search history.

(56) References Cited

U.S. PATENT DOCUMENTS

| | | | | |
|---|---|---|---|---|
| 3,607,466 A | * | 9/1971 | Miyazaki ..................... 438/489 |
| 4,492,121 A | * | 1/1985 | Lehto .......................... 73/705 |
| 4,495,819 A | * | 1/1985 | Tekippe ....................... 73/705 |
| 4,509,370 A | * | 4/1985 | Hirschfeld ................... 73/705 |
| 4,581,530 A | * | 4/1986 | Brogardh et al. ............ 73/705 |
| 4,708,494 A | * | 11/1987 | Kleinerman ................ 374/161 |
| 4,805,461 A | * | 2/1989 | Gupta et al. ................. 73/800 |
| 4,990,779 A | * | 2/1991 | Yoshitomi et al. .......... 250/310 |
| 5,706,094 A | * | 1/1998 | Maris .......................... 356/432 |
| 6,720,790 B1 | * | 4/2004 | Eriguchi et al. ............ 324/765 |
| 6,822,404 B1 | * | 11/2004 | Matsumoto et al. ........ 315/334 |
| 6,868,746 B1 | * | 3/2005 | Lorenz et al. ........... 73/862.53 |
| 2001/0040095 A1 | * | 11/2001 | Shimizu et al. ............. 204/603 |

OTHER PUBLICATIONS

"Optical Fluorescence from Chromium Ions in Sapphire: A Probe of the Image Stress," Acta. Metall. Mater., vol. 41, pp. 1811-1816, 1993; Qing Ma and D. R. Clarke.

"Measurement of Stresses Using Fluorescence in an Optical Microprobe: Stresses Around Indentations In A Chromium-Doped Sapphire," J. Am. Ceram. Soc., 73(11) pp. 3189-3194 (1990); Steven E. Molis and David R. Clarke.

"Novel Sapphire Fiber Thermometer Using Fluorescent Decay," Sensors and Acutators A71, pp. 70-73(1998); Yonghang Shen, Yani Want, Limin Tong, and Linhua Ye.

* cited by examiner

Primary Examiner—Max Noori
Assistant Examiner—Alandra Ellington
(74) Attorney, Agent, or Firm—Albert J. Fasulo, II

(57) ABSTRACT

A non-contact method for evaluating stress in a substrate. An impurity is non-uniformly introduced into at least one region of a crystalline substrate. The crystalline substrate is subjected to physical stress. Fluorescence producing energy is directed at the crystalline substrate. A fluorescence produced by the crystalline substrate is measured. The fluorescence is correlated with the stress on the crystalline substrate.

4 Claims, 5 Drawing Sheets

NON-CONTACT TECHNIQUE TO MONITOR SURFACE STRESS

CROSS-REFERENCE TO RELATED APPLICATIONS

This application is a divisional application of application Ser. No. 10/151,629, filed May 20, 2002, now U.S. Pat. No. 6,763,727 which claims the benefit of U.S. provisional application No. 60/292,254, filed on May 18, 2001, each of which is hereby incorporated by reference in its entirety.

STATEMENT OF GOVERNMENTAL INTEREST

This invention was made with Government support under Naval Sea Systems Command contract no. N00024-98-D-8124, Arlington, Va. The Government has certain rights in the invention.

BACKGROUND OF THE INVENTION

1. Field of the Invention

The present invention relates to evaluating stress on a surface without contacting the surface.

2. Description of the Related Art

Many advanced defense missile systems use an infrared (IR) seeker for the purpose of identifying and tracking the intended target of interest. Due to the nature of the aerothermal flight environment, the protective IR transparent window must be able to survive extremely high thermal stresses (>100 MPs) in order to prevent catastrophic failure. In many missile systems, the window material of choice has been crystalline sapphire, which has both optical and mechanical properties that are suitable over a wide range of operational flight conditions.

To assure the safe operation of a seeker window, the performance of the IR window under realistic stress and temperature conditions typically is examined. In this examination, the threshold limits of the material making up the window may be determined. Since the conditions encountered in use typically are extreme, the same conditions typically are encountered in testing. Testing often occurs in a wind tunnel. However, the measurement of sapphire window strain in hypersonic wind-tunnel applications is very difficult. Aerothermal heating and shear usually preclude the mounting of common strain gauges on the front side of windows under test. Back-side mounting is complicated by the extreme temperatures commonly seen by these windows.

In many test simulations, sample temperatures can easily exceed 500 degrees C. and can extend to 1000 degrees C. Temperatures of this magnitude prohibit the use of conventional, direct-contact strain gauge transducers. Along these lines, strain gauge adhesives typically break down at temperatures in the vicinity of 320 degrees C.

Mounting strain gauges on the back-side of the windows also does not allow the measurement of front-surface stresses. The physical size of strain gauges reduces spatial resolution and does not allow for a high density of measurements. Strain gauges are intrusive and can affect thermal gradients and, thereby, local strain gradients on the material under test. Crystalline windows are also commonly used with corrosives where strain gauges are attacked by the surrounding media.

Optical fluorescence provides an alternative approach to direct contact probing. Optical fluorescence relies on the ability to generate emission from ions such as chromium, magnesium, and vanadium that are embedded in a crystalline lattice of window materials. For example, it is known that chromium ions in crystalline sapphire produce a narrow-band fluorescence doublet in the red region of the spectrum. The doublet is sensitive to both temperature and stress in the sample. These two intense emission lines are termed the R-fluorescence lines.

The effect of an applied stress to a sapphire window is the distortion of the crystal field surrounding the chromium ion. The distortion changes the potential energy of the ion and, hence, the emission wavelength of the fluorescence radiation. Thus, the effect of stress can be quantitatively calibrated as a shift in the characteristics of the R-fluorescence lines and used as a non-contact probe of stress in sapphire windows.

SUMMARY OF THE INVENTION

The present invention provides a non-contact method for evaluating stress in a substrate. The method includes non-uniformly introducing at least one impurity into the crystalline substrate. The crystalline substrate is subjected to physical stress. Fluorescence producing energy is directed at the crystalline substrate. A fluorescence produced by the crystalline substrate is measured. The fluorescence spectrum is correlated with the stress on the crystalline substrate.

The present invention also includes a method for manufacturing a structure for non-contact evaluation of stress in the structure. According to the method at least one impurity is non-uniformly introduced into a crystalline substrate.

Additionally, the present invention provides a structure for non-contact evaluation of stress in the structure. The structure includes a crystalline substrate including at least one impurity non-uniformly distributed in the substrate.

Furthermore, the present invention provides a device for non-contact evaluation of stress in a substrate. The device includes a hollow cylindrical window support operable to support the substrate. A source of fluorescence producing energy is operable to direct the fluorescence producing energy at the substrate. A heat source is operable to subject the substrate to elevated temperature. A mechanical loading assembly is operable to subject the substrate to a mechanical load. A sensor is operable to detect fluorescence emitted from the substrate.

Still further, the present invention provides a non-contact method for evaluating stress in a sapphire window. The method includes subjecting to a physical stress a sapphire window that includes at least one impurity non-uniformly distributed in at least one region in the vicinity of at least one surface of the sapphire window. Fluorescence producing energy is directed at the sapphire window. A fluorescence produced by the sapphire window is measured. The fluorescence spectrum is correlated with the stress on the sapphire window.

Still other objects and advantages of the present invention will become readily apparent by those skilled in the art from a review of the following detailed description. The detailed description shows and describes preferred embodiments of the present invention, simply by way of illustration of the best mode contemplated of carrying out the invention. As will be realized, the present invention is capable of other and different embodiments and its several details are capable of modifications in various obvious respects, without departing from the present invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which.

DETAILED DESCRIPTION

Figure 1:
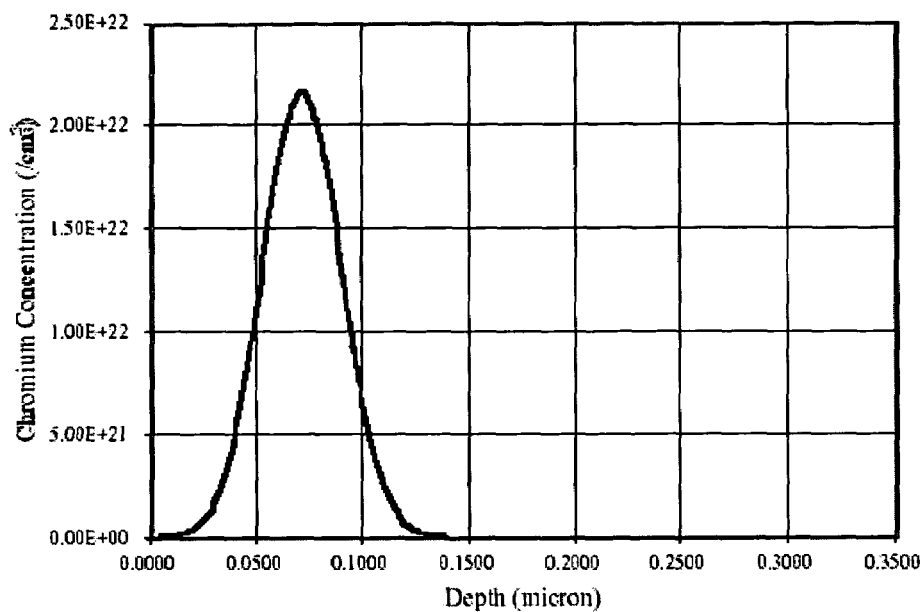
FIG. 1 represents a graph that illustrates a relationship between depth below the surface of a sapphire window and chromium concentration for an embodiment of a chromium doped sapphire window according to the present invention.

The present invention provides a method, device, and structure that permit non-contact measurement of stress on the structure. The stress is measured through optical techniques, measuring fluorescence produced by one or more materials introduced into the structure. The structure typically includes a crystalline substrate with one or more materials introduced non-uniformly in the crystal structure.

According to one particular application, the present invention provides an optical technique for measuring surface stress in chromium-doped sapphire windows. The approach utilizes the known effects of temperature and stress on the spectral profile of chromium ion fluorescence in crystalline sapphire. According to the present invention, sapphire windows may be selectively doped with a surface concentration of chromium ions, which provides a direct measure of the stress and temperature in the surface region of the window. A series of fluorescence measurements may be performed in a calibration apparatus to calibrate the effects of temperature and mechanical stress on the spectral characteristics of the surface fluorescence. The fluorescence can later be correlated with the spectra measured during substrate use or representative testing to determine in-situ stress. The present invention is particularly useful as a dynamic, non-contact probe of stress in infrared seeker windows while under simulated conditions of flight.

Although the present invention is discussed with respect to sapphire, it may be employed with other crystalline materials. For example, the invention may be employed with a yttria crystalline body. Other crystalline materials that the present invention may be employed with include silica and organic salts.

Similarly, although the present invention is discussed with respect to chromium as a chromophore, other chromophores may also be employed. For example, neodymium could be employed. Other chromophores that could be utilized include rare earth ions similar to neodymium. One example of such an ion is erbium.

In practice, any combination of dopants and/or crystalline substrates could be utilized that would permit monitoring of stress on the substrates. Dopant selection is largely dependent upon the substrate being monitored.

According to the present invention one or more impurity is distributed in at least one region in a substrate. Often, the impurity(ies) is selectively confined to one or more regions in the vicinity of at least one surface of the substrate. For example, the impurity could be distributed in a single region that extends substantially entirely along one surface of a substrate (see FIG. 9). According to another embodiment, the impurity is distributed to a plurality of regions in the vicinity of opposite surfaces of a substrate (see FIG. 10). The chromium or other impurity may be non-uniformly distributed with respect to depth. Any number of regions on any combination of surfaces may be employed if the arrangement permits monitoring stress as described herein.

In an embodiment where one or more impurities is/are introduced into one or more regions in the vicinity of one or more surfaces of a substrate, the regions may have a maximum depth of about 10 nm to about 200 nm. The peak concentration of the impurity(ies) is typically about $10^{20}$ to about $10^{22}$ ions/cm$^3$.

During use, crystalline substrates are often stressed differently at each surface. For example, optical windows are often in compressive stress on one surface while in tensile stress on the other. Impurities distributed in the substrate bulk typically would not result in a useful spectral profile since the varied contributions of impurities at various positions throughout the substrate typically could not be deconvoluted.

Selectively embedding the impurity(ies) in one or more regions in the vicinity of the surface of a substrate allows for measurement of local stress at that surface. As described in greater detail below, confining the impurity(ies) to region(s) in the vicinity of a surface can result in a spectral profile of surface fluorescence that is sensitive to both applied temperature and mechanical loading on that substrate surface. As a result, the optical signature may be utilized to quantify the amount of stress at the surface of the substrate. The distribution of impurity(ies) according to the present invention can influence the ion fluorescence in a way that is contrary to previously reported results obtained when utilizing a uniformly doped sapphire substrate.

Typically, the substrate employed according to the present invention is crystalline. However, the substrate could also be amorphous. If the substrate is crystalline, it may be monocrystalline. The crystalline substrate may be sapphire or another material.

The structural uses of single-crystal sapphire commonly include use as a window material in applications with high pressures, high temperatures, and aggressive chemicals. Sapphire windows are very strong and very hard. The transparency of the windows in the near IR makes them suitable as seeker windows on high-speed missiles. They are also highly resistant to chemical attack even at high temperature, making them very desirable windows for applications where acids and alkali are in use, particularly at high temperature. The crystalline and electrical properties of sapphire also make it desirable as a semiconductor substrate.

A variety of techniques may be employed to produce the doped region(s). One embodiment of the present invention employs a high-energy ion implantation technique for post-growth doping. This technique can create a highly non-uniform chromium distribution in the vicinity of one or more surface regions of a substrate, such as a sapphire window. According to one embodiment that utilizes a high-energy ion implantation technique, the implant is carried out at a temperature of about 1000 degrees C. with a beam energy of about 150 keV and an ion flux of about $10^{17}$ per square centimeter. Such parameters produce the concentration profile of chromium shown in FIG. 1, which resulted from a transport of ion in matter (TRIM) calculation. Alternatively, introduction of impurities into the substrate can be accomplished through other common microelectronic fabrication techniques such as diffusion, chemical vapor deposition (CVD), liquid phase epitaxy (LPE), or molecular beam epitaxy (MBE). Diffusion allows impurity deposition to several microns of the substrate surface. CVD and epitaxy techniques allow impurity deposition at any desired position within the substrate.

The sapphire substrates utilized in the examples described herein had a diameter of about 25.4 mm, a thickness of about 1 mm, and a crystalline c-axis oriented normal to the surface of the window. Such a sapphire substrate may be obtained from Crystal Systems, Inc., of Salem, Mass. The sapphire substrates received from the manufacturer were probed via optical fluorescence and observed to have no detectable level of chromium impurity. The sapphire substrates were subsequently doped with a chromium ion concentration procured from Epion Corporation of Billerica, Mass., using the technique of high-energy ion implantation described herein.

Figure 9:
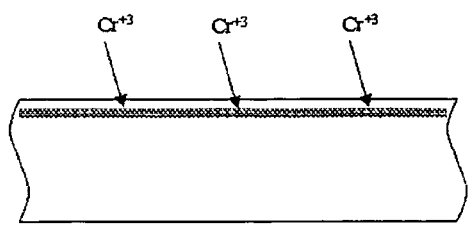
FIG. 9 represents a cross-sectional view of an embodiment of a sapphire window according to the present invention.
Figure 10:
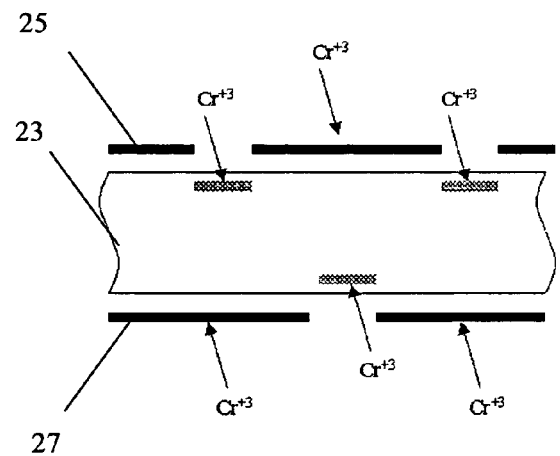
FIG. 10 represents a cross-sectional view of another embodiment of a sapphire window according to the present invention.

Masks may be employed in the implantation to develop surface patterns. This can permit increased isolation between measurement centers. Front- and back-surface stress measurements can also be taken simultaneously on one sample by offsetting doping sites, as illustrated in FIG. 10. Along these lines, FIG. 10 illustrates a high-purity sapphire substrate 23 being doped with chromium ions utilizing mask structures 25 and 27 on both sides of the substrate 23 to confine the chromium ions to selected locations. On the other hand, FIG. 9 illustrates chromium being doped along a single surface of a sapphire substrate.

Typically, no post implantation processes, such as annealing are utilized. However, annealing may be carried out after implantation to tailor the distribution of the ion concentration in the substrate.

The dopant is introduced into the region in the vicinity of the surface of a substrate to a maximum concentration of about 10 nm to about 200 nm. As described above, the concentration varies by depth. According to one embodiment, chromium ion is introduced into a sapphire substrate such that the peak concentration of chromium ion is about $10^{22}$ ions per cubic centimeter at a depth of about 70 nm below the surface of the sapphire. This concentration is significantly higher than the approximate $10^{17}$ cm$^{-3}$ bulk concentration level observed in most commercially grown sapphire windows.

To determine its ability to withstand stresses that it could encounter in use, a substrate is subjected to stress. As described above, a sapphire window reacts in a way that alters its fluorescence, thereby making it possible to determine a window's capacity to withstand stress. Any stress that a substrate may encounter in use may be applied to the substrate in a test setting to determine how the substrate reacts to stress.

In the testing setting, as any stress is applied to a substrate exciting energy is directed at the window. The exciting energy has characteristics that cause the chromium or other impurity in the substrate to fluoresce. The wavelength of exciting energy may depend upon the substrate and/or the impurity involved. A chromium doped sapphire window typically is subjected to electromagnetic radiation having wavelengths in green and/or ultraviolet regions of the spectrum. Typically, the radiation has wavelengths of about 450 nm to about 550 nm and an energy level of about 2.76 to about 2.25 eV, respectively. According to one particular embodiment, the electromagnetic radiation has a wavelength of about 532 nm and an energy of about 10 mW. One of ordinary skill in the art would be able to determine appropriate characteristics of exciting radiation to direct at a substrate suitable for the substrate, impurity(ies), fluorescence, stress, and/or other parameters.

The fluorescence produced can vary with the substrate and/or the impurity(ies) involved. A chromium doped sapphire window typically produces fluorescence having wavelengths of about 670 to about 720. Typically, fluorescence in a band having a wavelength of about 690 to about 700 nm is most useful. The characteristics of the fluorescence are measured and analyzed to correlate the fluorescence produced with the stress being applied. Typically, the peak position, bandwidth, and intensity are most useful in the analysis.

When a calibration of a substrate is being performed, the type and magnitude of stress applied to a substrate typically depends upon the stress that would be encountered in an application of interest. Along these lines, if the application is as a window for a targeting device as described above, the stresses encountered in such an application would be applied to the window during calibration. Exemplary embodiments include an application of mechanical force to a substrate of about 100 to about 1000 MPa. The stress may be applied to one or more locations on a substrate. The same or a different force may be applied to the substrate at each location. According to one embodiment, force is applied to one point or region centrally located on the substrate.

The fluorescence spectra is affected by substrate temperature as well as by stress. Therefore, the substrate must be calibrated at temperatures representative of those encountered in the application of interest. In calibration, a substrate may additionally or alternatively be subjected to temperatures above room temperature. Temperatures typically are about 22 degrees C. to about 600 degrees C.

Figure 2:
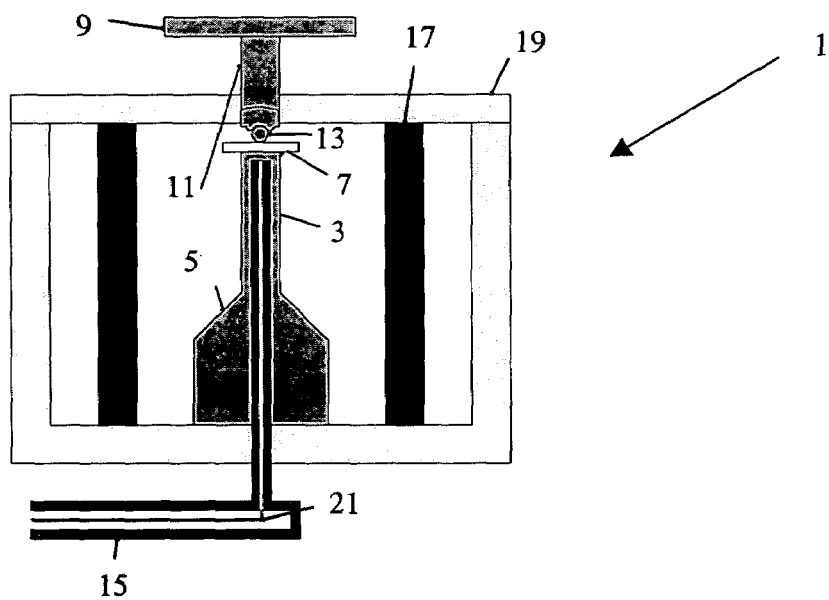
FIG. 2 represents a cross-sectional view of an embodiment of a calibration device according to the present invention.

Any apparatus that can apply heat, pressure and other stresses to a substrate while directing exciting energy toward the window and monitoring fluorescence produced may be employed to calibrate and/or test substrates. The present invention provides a device for carrying out non-contact techniques typically to calibrate surface stress in substrates. FIG. 2 illustrates a cross-sectional view of an embodiment of an apparatus that may be used to apply stress and temperature, while exciting and collecting fluorescence. With the embodiment shown in FIG. 2, both the optical and mechanical loading assembly may be placed within a high temperature heater, which can provide isothermal heating to a substrate.

The apparatus 1 shown in FIG. 2 includes a support 3 operable to support the substrate being tested. The support may be solid. In the embodiment shown in FIG. 2, the support includes a hollow cylinder. The interior of the cylinder may house other elements of the apparatus as described below.

The support may have any cross-sectional shape. Typically, the support includes a cross-section having a similar shape to the shape of the window being tested. Typically, the substrate being tested and the support both have a circular shape.

The support may include stabilizing members extending from laterally from the support. The stabilizing members help to ensure that the support remains in place as stress is force is applied to the substrate. Two stabilizing members 5 are visible in the view of the embodiment shown in FIG. 2.

The support may be made of any suitable material. The embodiment shown in FIG. 2 includes a stainless steel support. Other materials such as graphite could also be utilized.

The sapphire window 7 is arranged on the support 3. A load is applied to the window. The load may be supported by a load support 9 through a supporting arm 11. The load support and supporting arm may have any configuration, including shape and size. The embodiment shown in FIG. 2 includes a stainless steel load supporting arm. Other materials such as graphite could also be utilized.

A load applying surface contacts the surface of the substrate to apply the load. The load applying surface may be the tip of the supporting arm or load support or even the load itself. The load application surface may have any desired contour. Along these lines, the load application surface could be planar. Alternatively, the load application surface could have a spherical contour, could terminate in a point, or have any other contour.

The load may also be applied to the substrate with a separate load application member. For example, the embodiment shown in FIG. 2 includes a load application member 13. The load application member includes the load application surface have any contour as described above.

Figure 3:
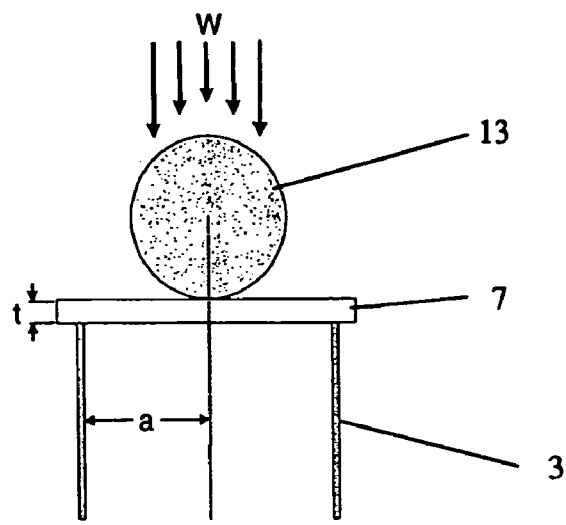
FIG. 3 represents a cross-sectional view of a portion of an embodiment of an apparatus according to the present invention carrying out calibration on an embodiment of a sapphire window.

FIG. 3 illustrates a close-up cross-sectional view of a portion of the apparatus shown in FIG. 2. FIG. 3 illustrates the upper portion of the substrate supporting member 3. The supporting member has a diameter of about 0.674 inches. The diameter of the supporting member 3 is smaller than the diameter of the substrate, which is in the shape of a disc. The substrate has a thickness t. A load W is applied to the substrate with ball 13. The load typically includes calibrated weights that apply a known mechanical stress. A ring may be used and is often preferred to a ball. The diameter of such a ring should be very small compared to the diameter of the window. In the embodiment shown in FIG. 3, the ball has a diameter of about 4 mm. The ball, ring or other load applicator may be made of any suitable material. Typically, the hardness of the material will permit application of a desired load. Examples of materials that may be utilized include stainless steel, as in the embodiment shown in FIG. 3, ceramic, carbon, or the materials could also be employed. Other materials that may be employed that can withstand the high load and term.

Employing a spherical load application surface is a good configuration to permit application of a compressive and tensile stress in the top and bottom surfaces, respectively. The assembly shown in FIG. 3 is designed to apply the load as a point contact onto the top surface the substrate, located concentrically with respect to the bottom graphite cylinder ring.

In the embodiment shown in FIGS. 2 and 3, the upper ring may not be rigidly attached to the upper graphite rod. The ring may be flush with the sample to help transfer a well distributed load properly into the sample. A smooth cup-and-ball socket may be used to allow the upper ring to align with the sample.

An apparatus for calibrating and/or testing a substrate also includes a source of exciting energy that can produce fluorescence in the substrate. The parameters of the energy are discussed above in greater detail. Any suitable energy source may be employed. For example, the embodiment shown in FIG. 2 includes an optical fiber assembly to deliver the energy to the substrate. The system shown in FIG. 3 delivers green light to a sapphire window substrate. According to one particular embodiment, a double Nd:YAG laser producing radiation having a wavelength of about 532 nm and delivered to the substrate through a single optical fiber. The infrared fluorescence having a wavelength of about 695 nm to about 750 nm is collected by a single optical fiber according to this embodiment.

An apparatus for calibrating and/or stress testing substrates also includes at least one element to sense, detect, or otherwise collect the fluorescence produced by the substrate as a result of interacting with the exciting energy. The embodiment shown in FIG. 2 includes a fiber optic assembly 21 to collect the energy produced by the substrate as it fluoresces. The fluorescence may be collected by one or more optical fibers positioned in the vicinity of a substrate. Typically, optical fibers for collecting the fluorescence are positioned as close as possible without touching. According to one embodiment, the optical fibers are positioned about 1 mm to about 3 mm away from a substrate.

The optical fibers collect the fluorescence and deliver it to a device that can analyze it. For example, although not shown in FIG. 2, the fluorescence from the optical fiber may be transmitted to a high spectral resolution spectrometer and CCD array detector for analysis. The emitted fluorescence is collected using a closely positioned optical fiber and routed to a narrow-band spectrometer. Changes in wave number, magnitude, and half-width of the emission lines may be evaluated to extract stress information.

The source of exciting energy and the sensing or collecting elements in an apparatus for testing and/or calibrating a substrate may be arranged anywhere as long as the energy can be delivered and fluorescence sensed or collected. In the embodiment shown in FIG. 2, these elements are arranged are arranged in the window support. According to the embodiment shown in FIG. 2, the exciting and collecting assembly was placed within a few millimeters of the substrate, providing both the source for optical excitation and collection of the emitted fluorescence signal.

Depending upon their composition, the source of exciting energy and the sensing or collecting elements in an apparatus for testing and/or calibration may be sensitive to heat applied to a substrate. For example, the relatively low threshold temperatures of an optic fiber system may make the cooling apparatus a necessity. As a result, the source of exciting energy and the sensing or collecting elements may require cooling.

To accomplish this cooling, an apparatus according to the present invention may include a cooling assembly. For example, the embodiment shown in FIG. 2 includes a water cooling system 15 to cool the source of exciting energy and the sensing or collecting elements. The cooling system 15 includes a jacket that surrounds the source of exciting energy and the sensing or collecting elements and bathes them in water. The cooling water may also be present within the supporting cylinder 3.

The cooling assembly shown in FIG. 2 shrouds the assembly within a water-cooled copper tubing package. The shroud can maintain a moderate temperature, such as on the order of less than about 50 degrees C., near the tip of each fiber when maximum heating conditions were applied to the sample, such as on the order of about 500 degrees C. Any coolant may be utilized to cool portions of the assembly.

An apparatus for calibrating and/or testing a substrate may also include a heat source and/or cooling source to subject a substrate to temperatures above and/or below room temperature. When calibrating and/or testing a substrate, the temperature exposure may be non-uniform. The embodiment of the apparatus shown in FIG. 2 includes a heater 17 to subject the substrate to heat to simulate conditions that the substrate may encounter in an end use. Any heat source may be utilized with the present invention. To maintain the heated environment, at least the portion of the apparatus that includes the substrate may be enclosed within an insulating enclosure 19. In the embodiment shown in FIG. 2, portions of the substrate support 3 and the load support 11 are enclosed within the insulating enclosure.

As described above, chromium may be utilized to dope the sapphire window. In a sapphire lattice, chromium is known to be a substitutional replacement for aluminum at low concentrations, where the position of the ion is the octahedral coordinated location adjacent to both end oxygen and aluminum ion. The octahedron lattice of sapphire is slightly distorted (anisotropic crystal field), which produces a doublet rather than singlet fluorescence band profile. The doublet is termed the "R-fluorescence" band, composed of the $R_1$ (694.85 nm) and $R_2$ (693.37 nm) emission lines.

Figure 4:
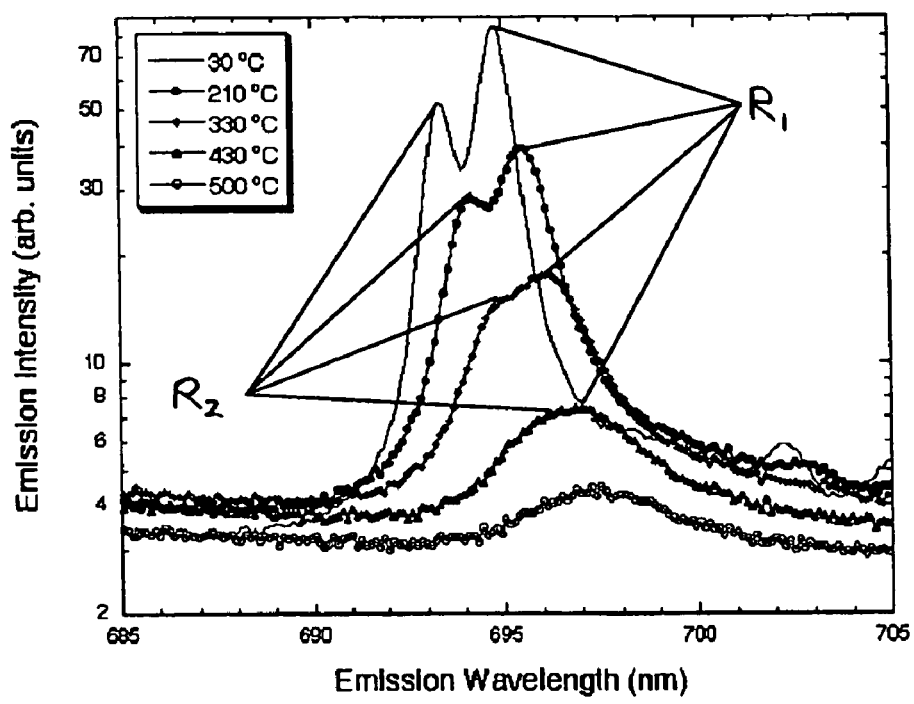
FIG. 4 represents a graph that illustrates relationships between emission wavelength and emission intensity when subjecting a sapphire window to various temperatures.

FIG. 4 illustrates the effects of temperature on the emission characteristics of the $R_1$ and $R_2$ lines of the chromium ion distribution in sapphire windows according to the present invention. Along these lines, FIG. 4 illustrates $R_1$ and $R_2$ fluorescence bands from chromium doped sapphire as a function of sample temperature 30 degrees C., 210 degrees C., 330 degrees C., 430 degrees C., and 500 degrees C. The effects of increasing temperature are the reduction, broadening, red shifting, and merging of the fluorescence bands, results that are analogous to previous temperature studies of low concentration, chromium-doped sapphire. An increase in substrate temperature may result in a stronger interaction between the chromium ion and the surrounding lattice, which may reduce the radioactive, i.e., fluorescence, efficiency. Similarly, the shift to longer wavelengths may be a result of the internal compressive strain that accompanies the thermal expansion of the lattice. The two emission peaks do not appear to have the same temperature dependence, which results in the merging of the doublet at about 430 degrees C.

Figure 5:
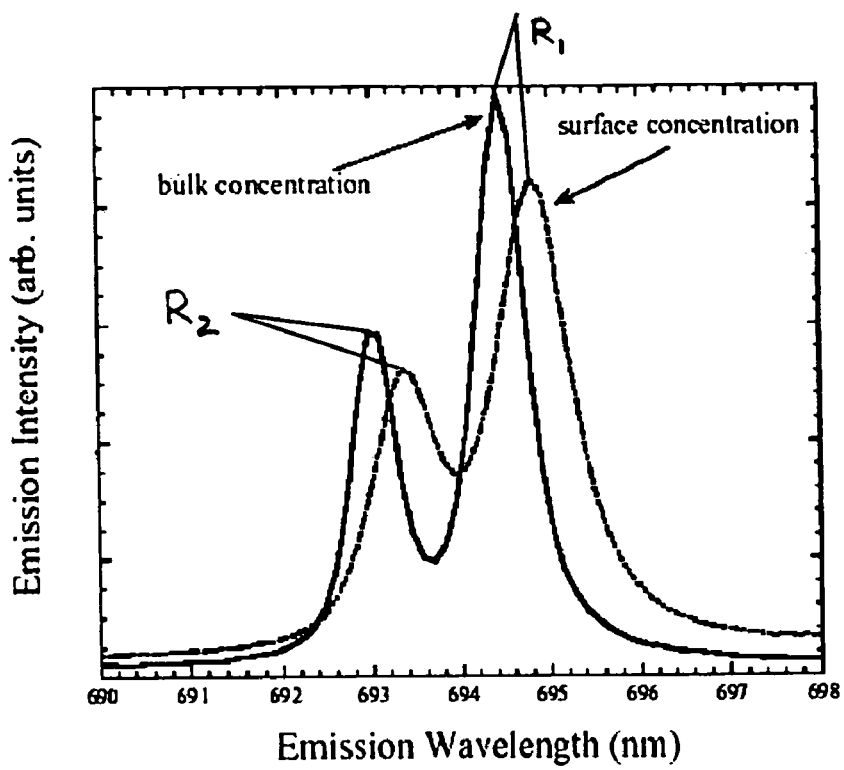
FIG. 5 represents a graph that illustrates relationships between emission wavelength and emission intensity for an embodiment of a sapphire window according to the present invention and a known sapphire window.

The peak position and line width of the two emission bands in the room temperature spectrum was shifted about 0.37 nm to longer wavelengths as compared to the corresponding peaks in a sapphire sample with a considerably lower chromium concentration, as shown in FIG. 5. Along these lines, FIG. 5 illustrates a comparison of chromium fluorescence bands from low concentration, uniformly doped sample (solid line) and high peak concentration, non-uniformly doped sample (dashed line). The emission intensity from the non-uniform sample was approximately 75 percent lower than that of the bulk sample.

In addition to the red shift in peak position, the line width of the implanted sample was about 36 percent broader than the low concentration sample. The shift in peak position may be attributed to the volumetric strain that is induced and sensed by the chromium ion when the ion is substituted for the smaller aluminum ion in the sapphire lattice, similar to the internal strain that is arises from thermal expansion of the lattice. The effect of the larger ion within the crystal is a distortion of the lattice, which may increase internal strain and shifts the R-fluorescence peaks to longer wavelengths.

As was illustrated by Ma et al., *Optical fluorescence from chromium ions in sapphire: A probe of the image stress*, Acta Metall. Mater. 41, pp. 1811–1816 (1993), and Kaplyanskii et al., Sov. Phys. Solid St., 10, 1864 (1969), the entire contents of the disclosure of which is hereby incorporated by reference, the relationship between the red shift in peak position of the $R_1$, and $R_2$ lines and chromium concentration is given by Equation (1) below:

$$\Delta v = 99 c_m \tag{1}$$

where $\Delta v$ represents a peak position in wavenumbers and $c_m$ represents the chromium concentration in weight percent. Accordingly, it is also expected that the linewidth for the ion-implanted sample will be significantly broadened with respect to the uniformly doped sapphire window. As shown in FIG. 1, the ion concentration is markedly inhomogeneous, which should produce a continuous variation in the internal stress and, hence, the peak position of the fluorescence bands. Therefore, the results shown in FIG. 5 indicate that there is a high peak value of internal strain in surface layer, where the strain varies continuously throughout the ion distribution in the surface layer.

Figure 6:
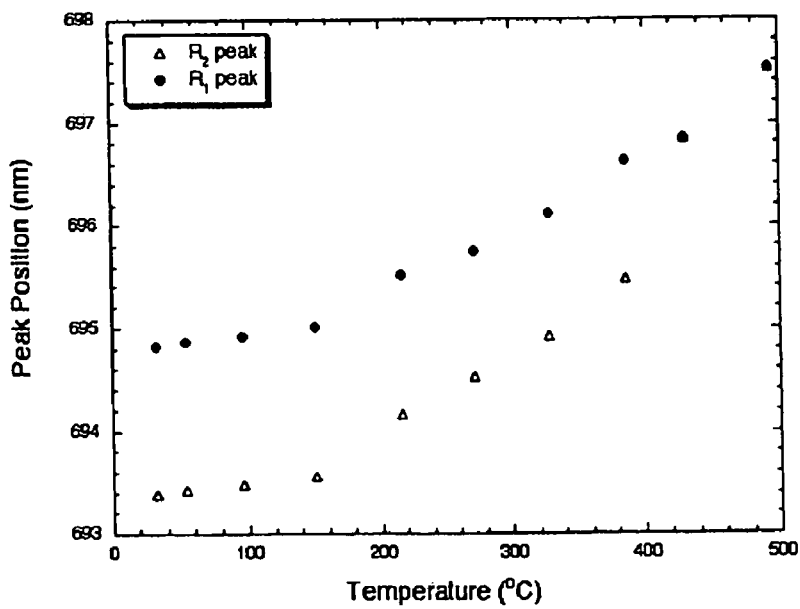
FIG. 6 represents a graph that illustrates a relationship between temperature and peak position of fluorescence bands produced by an embodiment of a sapphire window according to the present invention.

FIG. 6 shows a plot of the peak position of the two fluorescence bands shown in FIG. 4 versus sample temperature. The two bands did not display the same dependence on temperature, which led to their subsequent merging at a temperature of approximately 430 degrees C. The peak positional shifts exhibited linear behavior over the temperature range of about 100 to about 380 degrees C., with a slope value of about 0.0066 nm/° C. and 0.0081 nm/° C. for the $R_1$ (diamond) and $R_2$ (triangle) bands, respectively. Despite the non-uniform distribution of the chromium ion concentration, it has been determined that the temperature dependence of the fluorescence is analogous to the corresponding emission peaks in low concentration chromium-doped sapphire.

Figure 7:
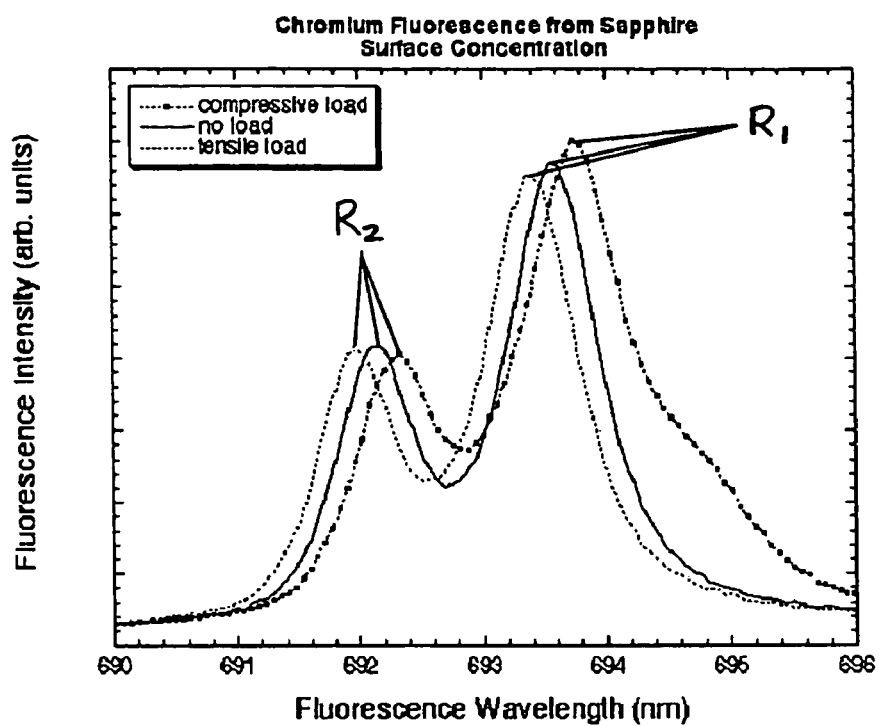
FIG. 7 represents a graph that illustrates relationships between fluorescence wavelength and fluorescence intensity produced by an embodiment of a sapphire window according to the present invention when subjected to various types of loads.

FIG. 7 illustrates the results of a comparison of the fluorescence from the unstressed or unloaded sapphire window (solid line) to a window under compressive (dot-dash line) and tensile stress (dashed line). For the stressed measurements, a load of 50 pounds was placed on the ball-on-ring assembly shown in FIGS. 2 and 3. The observed magnitude of peak position shift is the same for the two loading condition, 0.19 nm, but is directed towards the red for compressive and towards the blue for tensile. There is a shoulder in the compressive spectrum. This may result from a different distribution of applied stress for the two measurements, since only the compressively loaded surface is in direct contact with the stainless steel ball. However, the qualitative behavior illustrated in FIG. 7, that is, red-shift for compressive and blue-shift for tensile load, is consistent with other stress measurements of chromium doped sapphire.

Figure 8:
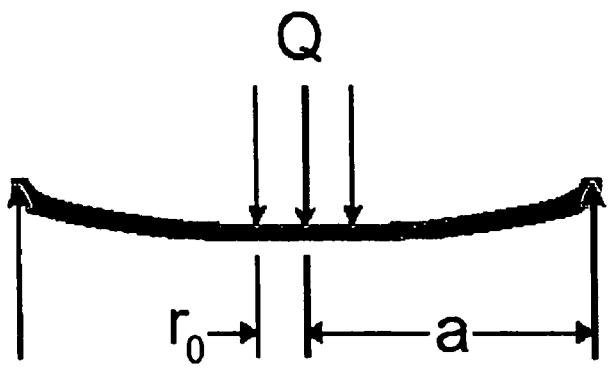
FIG. 8 represents a cross-sectional view of a sapphire window illustrating a force being applied thereto.

The process of calibrating the effects of stress on the spectral profile of the chromium fluorescence typically includes calculating stress levels in a sapphire window when using a ball-on-ring assembly such as is shown in FIGS. 2 and 3. FIG. 8 illustrates the response of a circular sample to a uniform load Q that is distributed over a small radius $r_0$ within a ring of radius a. The edge of the sample is simply supported. The degree of sample deflection is greatly exaggerated.

Under the loading arrangement shown in FIG. 8, the upper and lower surfaces of the sample are in compressive and tensile stress, respectively. Using the stress analysis of Roark and Young, *Formulas for stress and strain*, 5th ed. (1980), the entire contents of the $$\sigma_r = \frac{3W}{8\pi t^2}\left[4(1+\mu)\ln\frac{a}{r} + (1-\mu)\left(\frac{a^2-r^2}{a^2}\right)\frac{r_o'^2}{r^2}\right] \quad (2)$$

disclosure of which are hereby incorporated by reference, for a load applied at the center of a ring structure, the following equations relate the magnitude of the radial stress at the surface to the applied load on the sapphire sample. In Equation (2)

where $\epsilon r_r$=radial stress in the surface layer, W=applied load, t=thickness of the sapphire window, a=radius of the support ring, which is 0.674 in the apparatus shown in FIGS. 2 and 3, $r_0$=radius of contact area of load with substrate, $r_0'$=adjusted radius of contact area of load with substrate, r=point at which stress is being measured, and $\mu$=Poisson's ratio, which is 0.25 for sapphire. For the case in which $r_0'$ is very small compared to the thickness of the material t, $r_0'$, is given by equation (3) below:

$$r_o' = \sqrt{1.6r_o^2 + t^2} - 0.675t \quad (3)$$

In the case of a stainless steel ball on the sapphire sample, the radius of the contact area was considered to be infinitesimal since the deformation associated with the applied load in FIG. 7 was very small, (less than about 1 micron). Also, with this ball-on-ring configuration, the maximum tangential and maximum radial stresses are equal and are represented by $\sigma_{max}$. Since both sapphire and the metal ball are very hard, $r_0$ is assumed to be zero and, therefore, $r_0'$ is assumed to equal 0.325t. For the special case in which the $$\sigma_r = \frac{3W}{2\pi t^2}\left[(1+\mu)\ln\frac{a}{r_o'} + 1\right] \quad (4)$$

excitation source was located directly under the center of the ring, the magnitude of the radial stress that perturbed the chromium fluorescence is given by the equation (4) below:

Using equation (4), the maximum stress at the center of the top and bottom surfaces of the sapphire wafer was calculated for a 50 pound load applied to the center of the ring. A value of 0.25 was used for $-\mu$, and the loading contact radius was considered infinitesimal (~0). Under these conditions, the calculated stress was about 563 MPa at the center of the top and bottom surface. From the results shown in FIG. 7, a value of 0.34 nm/GPa was determined for the stress coefficient of the $R_1$ and $R_2$ bands (compressive and tensile), which is close to a previously determined value of 0.38 nm/GPa for uniformly doped sapphire. The two peaks should have slightly different values to their stress-dependent shifts, which is a result of the anisotropy of the sapphire crystal.

In a chromium doped sapphire window, peak emission lines react in a predictable fashion in response to the local temperature and mechanical stress of the sample. Along these lines, an increase in sample temperature results in a reduction, broadening, red-shifting, and merging of the bands. Compressive mechanical stress results in a red-shift of the bands without reduction, broadening, or merging. Tensile mechanical stress produces such a shift to the blue.

An alternative to the apparatus described above and shown in FIGS. 2 and 3 could include a window support that operable to support a sapphire window in wind tunnel, where the window could be subjected to conditions that more closely approach the conditions that would be encountered in flight. Such an apparatus could still include elements for delivering exciting radiation and collecting fluorescence as well as generating heat if necessary.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A device for non-contact evaluation of stress in a substrate, the device comprising:
    a hollow cylindrical window support operable to support the substrate;
    a source of fluorescence producing energy operable to direct the fluorescence producing energy at the substrate;
    a heat source, other than the fluorescence producing energy, operable to subject the substrate to elevated temperature;
    a mechanical loading assembly operable to subject the substrate to a mechanical load;
    a sensor operable to detect fluorescence emitted from the substrate; and
    a water cooling assembly for cooling at least the source of fluorescence producing energy and the sensor,
    wherein the mechanical loading assembly comprises a shaped force application member operable to contact a surface of the substrate.

2. The device according to claim 1, wherein the device applies tensile and compressive forces to the substrate.

3. The device according to claim 1, wherein the supporting cylinder has a circular cross-section having a diameter smaller than a length and a width of the substrate.

4. The device according to claim 1, wherein the load assembly applies the mechanical load to the substrate centered with respect to the cylinder.

* * * * *